US006902801B2

(12) United States Patent
Charnock et al.

(10) Patent No.: US 6,902,801 B2
(45) Date of Patent: Jun. 7, 2005

(54) COMPOSITE ION EXCHANGE MATERIAL

(75) Inventors: Peter Charnock, Poulton-le-Fylde (GB); Brian Wilson, Garstang (GB); Richard F. Bridges, Poulton-le-Fylde (GB)

(73) Assignee: Victrex Manufacturing Limited, Thornton Cleveley (GB)

( * ) Notice: Subject to any disclaimer, the term of this patent is extended or adjusted under 35 U.S.C. 154(b) by 0 days.

(21) Appl. No.: 10/239,143

(22) PCT Filed: Mar. 21, 2001

(86) PCT No.: PCT/GB01/01243

§ 371 (c)(1),
(2), (4) Date: Dec. 19, 2002

(87) PCT Pub. No.: WO01/70858

PCT Pub. Date: Sep. 27, 2001

(65) Prior Publication Data

US 2004/0005474 A1 Jan. 8, 2004

(30) Foreign Application Priority Data

Mar. 22, 2000 (GB) .............................................. 0006883
Dec. 21, 2000 (GB) .............................................. 0031209

(51) Int. Cl.[7] .......................... B32B 3/26; B32B 27/04; B32B 27/30; H01M 8/10
(52) U.S. Cl. ................................ 428/320.2; 428/411.1; 428/421; 428/500; 429/30; 429/33
(58) Field of Search ........................... 428/320.2, 411.1, 428/421, 500; 429/30, 33; 252/500

(56) References Cited

U.S. PATENT DOCUMENTS 5,556,700 A * 9/1996 Kaneto et al. ............... 428/332
5,733,678 A * 3/1998 Ledjeff et al. ................. 429/30

FOREIGN PATENT DOCUMENTS

| EP | 0 574 791 A2 | 12/1993 |
| WO | WO 98/50457 | 11/1998 |
| WO | WO 98/51733 | 11/1998 |
| WO | WO 00/15691 | 3/2000 |
| WO | WO 01/19896 A1 | 3/2001 |

OTHER PUBLICATIONS

Patent Abstracts of Japan, vol. 017, No. 190; JP 04 341333; 11/1992; "Composite Reverse Osmosis Membrane"; abstract.

* cited by examiner

Primary Examiner—Ramsey Zacharia
(74) Attorney, Agent, or Firm—Nixon & Vanderhye

(57) ABSTRACT

A composite material, for example a composite membrane for a polymer electrolyte membrane fuel cell includes a first conductive polymer and a support material for the polymer, wherein the support material comprises a second conductive polymer. A method making of the composite material is also disclosed as is its use as a polymer electrolyte membrane in a fuel cell.

21 Claims, 5 Drawing Sheets

Polyetheretherketone

Polyetherketone

Polyetherketoneketone

Polyetherketoneether-
ketoneketone

Polyetherketoneketone

Polyetheretherketone-
etherketone

Polyetherdiphenylether-
ketone

| | |
|---|---|
| PEI (polyetherimide)<br><br>R=aryl, alkyl, aryl ether or alkylether | structure of PEI polymer |
| Udel polysulfone | structure of Udel polysulfone |
| Radel R polyphenylsulfone | structure of Radel R polyphenylsulfone |
| Radel A polyethersulfone | structure 1<br><br>and<br><br>structure 2 |
| poly(trifluoro-methyl-bis(phthalimide)-phenylene) | structure of poly(trifluoro-methyl-bis(phthalimide)-phenylene) |
| poly(triphenylphosphine oxide sulfide-phenylsulfone-sulfide) | structure of poly(triphenylphosphine oxide sulfide-phenylsulfone-sulfide) |
| (PBO-PI) poly(benz(bis)oxazole | structure of PBO-PI |
| poly(phenylsulfide 1,4-phenylene) | structure of poly(phenylsulfide 1,4-phenylene) |

Figure 3a

| | |
|---|---|
| poly(trifluoromethyl-bis(phthalimide)-phenylsulfone |  |
| (PVSA) polyvinyl sulfonic acid |  |
| poly(phthalimide ditrifluoromethyl methylene phthalimide-1,3-phenylene ether) |  |
| poly-x (maxdem) |  |
| poly(pyrolmellitic diimide-1,3-phenylene) |  |
| poly(diphthalimide-1,3-phenylene) |  |
| (PPO) poly(1,4-phenylene oxide) |  |
| Diphenyl PPO (poly(3,5-diphenyl-1,4-phenylene oxide) |  |
| PBPS (poly(benzophenone sulfide)) |  |

| | |
|---|---|
| poly(benzophenone sulfide-phenylsulfone-sulfide) | $\left[ \phantom{x} \text{-C}_6\text{H}_4\text{-CO-C}_6\text{H}_4\text{-S-C}_6\text{H}_4\text{-SO}_2\text{-C}_6\text{H}_4\text{-S-} \phantom{x} \right]_n$ |
| polyvinyl carboxylic acid | $\left[ -\text{CH(CO}_2\text{H)-CH}_2- \right]_n$ |
| trifluoro styrene | $\left[ -\text{CF(C}_6\text{H}_5\text{)-CF}_2- \right]_n$ |
| polyvinyl phosphonic acid | $\left[ -\text{CH(PO}_3\text{H}_2\text{)-CH}_2- \right]_n$ |
| polyvinyl carboxylic acid | $\left[ -\text{CH(CO}_2\text{H)-CH}_2- \right]_n$ |
| polystyrene sulfonic acid (PSSA) | $\left[ -\text{CH(C}_6\text{H}_5\text{)-CH}_2- \right]_n$ |

Figure 3c

COMPOSITE ION EXCHANGE MATERIAL

This invention relates to a composite ion-exchange material, for example ion-exchange membrane and provides such a material per se and a method of making such a material.

BACKGROUND OF THE INVENTION

One type of known polymer electrolyte membrane fuel cell (PEMFC), shown schematically in FIG. 1 of the accompanying diagrammatic drawings, may comprise a thin sheet 2 of a hydrogen-ion conducting Polymer Electrolyte Membrane (PEM) sandwiched on both sides by a layer 4 of platinum catalyst and an electrode 6. The layers 2, 4, 6 make up a Membrane Electrode Assembly (MEA) of less than 1 mm thickness.

In a PEMFC, hydrogen is introduced at the anode (fuel electrode) which results in the following electrochemical reaction:

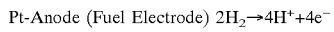

Pt-Anode (Fuel Electrode) $2H_2 \rightarrow 4H^+ + 4e^-$

The hydrogen ions migrate through the conducting PEM to the cathode. Simultaneously, an oxidant is introduced at the cathode (oxidant electrode) where the following electrochemical reaction takes place:

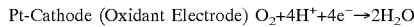

Pt-Cathode (Oxidant Electrode) $O_2 + 4H^+ + 4e^- \rightarrow 2H_2O$

Thus, electrons and protons are consumed to produce water and heat. Connecting the two electrodes through an external circuit causes an electrical current to flow in the circuit and withdraw electrical power from the cell.

The PEM 2 could comprise a single layer of ion-conducting material. However, in many cases, a single layer of material does not have satisfactory mechanical properties. Many proposals have been made for improving the mechanical and other properties of ion-conducting materials for as PEMs. For example, U.S. Pat. No. 5,834,566 (Hoechst) solves the problem by providing homogenous polymer alloys based on sulphonated polyether ketones, whereby the absorption capacity for water and mechanical properties can be adjusted in a controlled manner by varying the components in the alloy and their respective ratios.

SUMMARY OF THE INVENTION

It is an object of the present invention to address problems associated with Polymer Electrolyte Membranes.

According to a first aspect of the invention, there is provided a composite material, for example a composite membrane, which includes a first conductive polymer and a support material for the polymer, wherein the support material comprises a second conductive polymer.

Said first conductive polymer may comprise a thermoplastic or thermoset aromatic polymer, a polybenzazole or a polyaramid polymer, a perfluorinated ionomer, each of which has been functionalised to provide ion-exchange sites; polystyrene sulfonic acid (PSSA), polytrifluorostyrene sulfonic acid (such as those prepared from alpha, beta, beta-trifluorostyrenes as described in U.S. Pat. No. 5,422,411, U.S. Pat. No. 5,773,480 and U.S. Pat. No. 5,834,523), polyvinyl phosphonic acid (PVPA), polyvinyl carboxylic (PVCA) acid and polyvinyl sulfonic acid (PVSA) polymers, and metal salts thereof.

Examples of aromatic polymers include polysulfone (PSU), polyimide (PI), polyphenylene oxide (PPO), polyphenylene sulfoxide (PPSO), polyphenylene sulfide (PPS), polyphenylene sulfide sulfone (PPS/SO₂), polyparaphenylene (PPP), polyphenylquinoxaline (PPQ), polyarylketone and polyetherketone polymers, especially polyetherketone and polyetheretherketone polymers, for example PEK™ polymers and PEEK™ polymers respectively, from Victrex Plc.

Examples of perfluorinated ionomers include carboxyl-, phosphonyl- or sulphonyl-substituted perfluorinated vinyl ethers.

Examples of one class of preferred first conductive polymers are the polymers shown in FIGS. 3a to 3c when functionalised to provide ion-exchange sites.

A preferred first conductive polymer is one having a moiety of formula

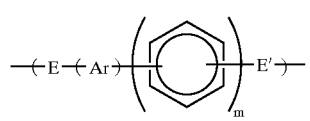

I and/or a moiety of formula

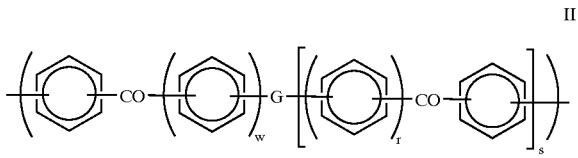

II and/or a moiety of formula

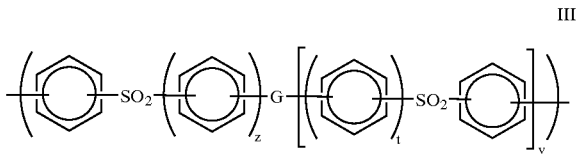

III wherein at least some of the units I, II and/or III are funtionalized to provide ion-exchange sites; wherein the phenyl moieties in units I, II, and III are independently optionally substituted and optionally cross-linked; and wherein m, r, s, t, v, w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)* or (i) to (x) which is bonded via one or more of its phenyl moieties to adjacent moieties

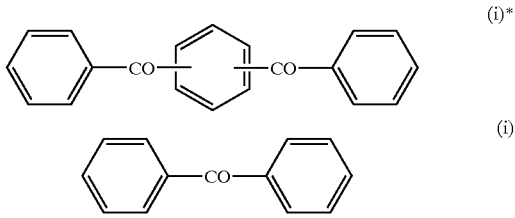

(i)*

(i)

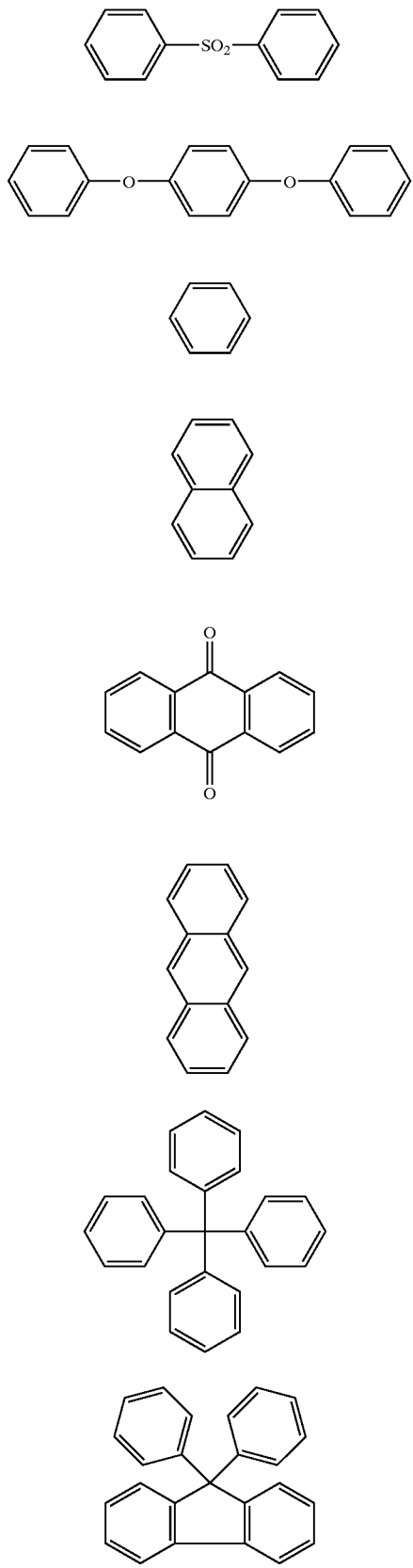

In (i)*, the middle phenyl may be 1,4- or 1,3-substituted.

Suitably, to provide said ion exchange sites, said polymer is sulphonated, phosphorylated, carboxylated, quaternary-aminoalkylated or chloromethylated, and optionally further modified to yield —$CH_2PO_3H_2$, —$CH_2NR_3^{20+}$ where $R^{20}$ is an alkyl, or —$CH_2NAr_3^{x+}$ where $Ar^x$ is an aromatic (arene), to provide a cation or anion exchange membrane. Further still, the aromatic moiety may contain a hydroxyl group which can be readily elaborated by existing methods to generate —$OSO_3H$ and —$OPO_3H_2$ cationic exchange sites on the polymer. Ion exchange sites of the type stated may be provided as described in WO95/08581.

Preferably, said first conductive polymer is sulphonated. Preferably, the only ion-exchange sites of said first conductive polymer are sites which are sulphonated.

References to sulphonation include a reference to substitution with a group —$SO_3M$ wherein M stands for one or more elements selected with due consideration to ionic valencies from the following group: H, $NR_4^{y+}$, in which $R^y$ stands for H, $C_1$–$C_4$ alkyl, or an alkali or alkaline earth metal or a metal of sub-group 8, preferably H, $NR_4^+$, Na, K, Ca, Mg, Fe, and Pt. Preferably M represents H. Sulphonation of the type stated may be provided as described in WO96/29360.

Unless otherwise stated in this specification, a phenyl moiety may have 1,4- or 1,3-, especially 1,4-, linkages to moieties to which it is bonded.

Said first conductive polymer may include more than one different type of repeat unit of formula I; more than one different type of repeat unit of formula II; and more than one different type of repeat unit of formula III.

Said moieties I, II and III are suitably repeat units. In the polymer, units I, II and/or III are suitably bonded to one another—that is, with no other atoms or groups being bonded between units I, II, and III.

Where the phenyl moieties in units I, II or III are optionally substituted, they may be optionally substituted by one or more halogen, especially fluorine and chlorine, atoms or alkyl, cycloalkyl or phenyl groups. Preferred alkyl groups are $C_{1-10}$, especially $C_{1-4}$, alkyl groups. Preferred cycloalkyl groups include cyclohexyl and multicyclic groups, for example adamantyl. In some cases, the optional substituents may be used in the cross-linking of the polymer. For example, hydrocarbon optional substituents may be functionalised, for example sulphonated, to allow a cross-linking reaction to take place. Preferably, said phenyl moieties are unsubstituted.

Another group of optional substituents of the phenyl moieties in units I, II or III include alkyls, halogens, $C_yF_{2y+1}$ where y is an integer greater than zero, O—$R^q$ (where $R^q$ is selected from the group consisting of alkyls, perfluoralkyls and aryls), $CF=CF_2$, CN, $NO_2$ and OH. Trifluormethylated phenyl moieties may be preferred in some circumstances.

Where said polymer is cross-linked, it is suitably cross-linked so as to improve its properties as a polymer electrolyte membrane, for example to reduce its swellability in water. Any suitable means may be used to effect cross-linking. For example, where E represents a sulphur atom, cross-linking between polymer chains may be effected via sulphur atoms on respective chains. Alternatively, said polymer may be cross-linked via sulphonamide bridges as described in U.S. Pat. No. 5,561,202. A further alternative is to effect cross-linking as described in EP-A-0008895.

However, for first conductive polymers according to the inventions described herein which are crystalline (which some are) there may be no need to effect cross-linking to produce a material which can be used as a polymer electrolyte membrane. Such polymers may be easier to prepare than cross-linked polymers. Thus, said first conductive polymer of the inventions described herein may be crystalline. Preferably, said polymer is not optionally cross-linked as described.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the polymer does not include a —S— moiety. Preferably, G represents a direct link.

Suitably, "a" represents the mole % of units of formula I in said polymer, suitably wherein each unit I is the same; "b" represents the mole % of units of formula II in said polymer, suitably wherein each unit II is the same; and "c" represents the mole % of units of formula III in said polymer, suitably wherein each unit III is the same. Preferably, a is in the range 45–100, more preferably in the range 45–55, especially in the range 48–52. Preferably, the sum of b and c is in the range 0–55, more preferably in the range 45–55, especially in the range 48–52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said polymer consists essentially of moieties I, II and/or III.

Said first conductive polymer may be a homopolymer having a repeat unit of general formula

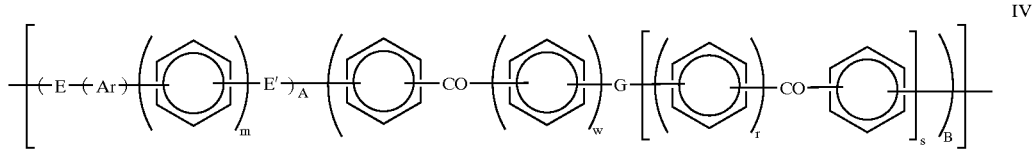

IV or a homopolymer having a repeat unit of general formula

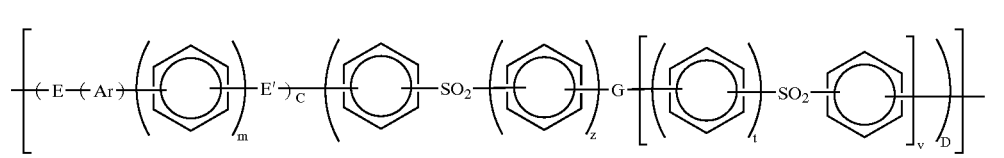

V or a random or block copolymer of at least two different units of IV and/or V wherein A, B, C and D independently represent 0 or 1 and E, E', G, Ar, m, r, s, t, v, w and z are as described in any statement herein.

As an alternative to a first conductive polymer comprising units IV and/or V discussed above, said polymer may be a homopolymer having a repeat unit of general formula

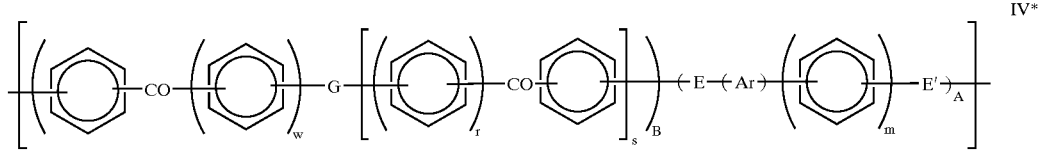

IV* or a homopolymer having a repeat unit of general formula

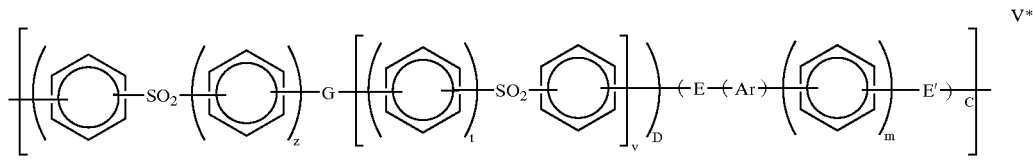

or a random or block copolymer of at least two different units of IV* and/or V*, wherein A, B, C, and D independently represent 0 or 1 and E, E', G, Ar, m, r, s, t, v, w and z are as described in any statement herein.

Preferably, m is in the range 0–3, more preferably 0–2, especially 0–1. Preferably, r is in the range 0–3, more preferably 0–2, especially 0–1. Preferably t is in the range 0–3, more preferably 0–2, especially 0–1. Preferably, s is 0 or 1. Preferably v is 0 or 1. Preferably, w is 0 or 1. Preferably z is 0 or 1.

Preferably Ar is selected from the following moieties (xi)* and (xi) to (xxi):

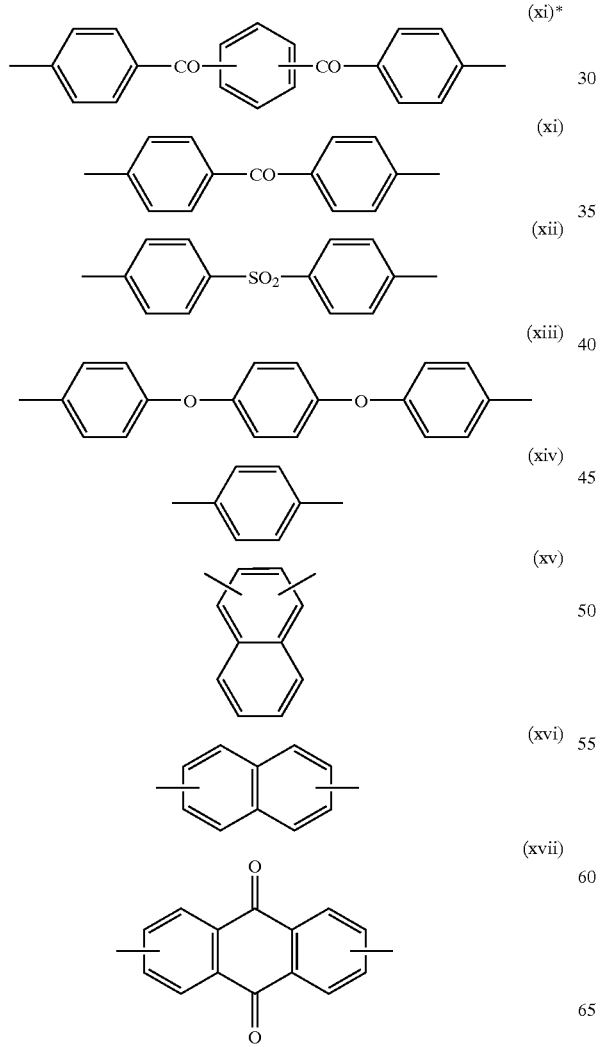

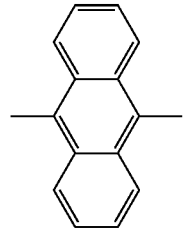

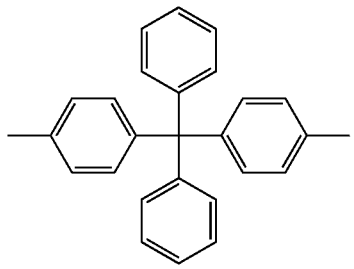

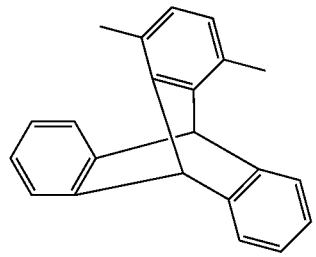

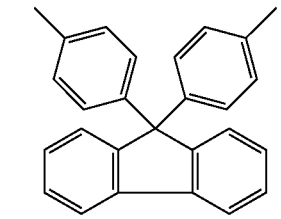

In (xi)*, the middle phenyl may be 1,4- or 1,3-substituted. Preferably, (xv) is selected from a 1,2-, 1,3-, or a 1,5-moiety; (xvi) is selected from a 1,6-, 2,3-, 2,6- or a 2,7-moiety; and (xvii) is selected from a 1,2-, 1,4-, 1,5-, 1,8- or a 2,6-moiety.

One preferred class of first conductive polymers may include at least some ketone moieties in the polymeric chain. In such a preferred class, the polymer preferably does not only include —O— and —SO$_2$— moieties between aryl (or other unsaturated) moieties in the polymeric chain. Thus, in this case, suitably, a polymer of the first and/or second aspects does not consist only of moieties of formula III, but also includes moieties of formula I and/or II.

One preferred class of first conductive polymers does not include any moieties of formula III, but suitably only includes moieties of formulae I and/or II. Where said polymer is a homopolymer or random or block copolymer as described, said homopolymer or copolymer suitably includes a repeat unit of general formula IV. Such a polymer may, in some embodiments, not include any repeat unit of general formula V.

Suitable moieties Ar are moieties (i)*,(i), (ii), (iv) and (v) and, of these, moieties (i*), (i), (ii) and (iv) are preferred. Preferred moieties Ar are moieties (xi)*, (xi), (xii), (xiv), (xv) and (xvi) and, of these, moieties (xi)*, (xi), (xii) and (xiv) are especially preferred. Another preferred moiety is moiety (v), especially, moiety (xvi). In relation, in particular to the alternative polymers comprising units IV* and/or V*, preferred Ar moieties are (v) and, especially, (xvi).

Preferred first conductive polymers include an electron-rich, relatively non-deactivated, easily sulphonatable unit, for example a multi-phenylene moiety or a fused-rings aromatic moiety, such as naphthalene. Such an easy to sulphonate unit may be sulphonated under relatively mild conditions to introduce two sulphonate groups per unit. Thus, preferred polymers may have at least $10\pi$ electrons in a delocalized aromatic moiety. The number of $\pi$ electrons may be 12 or less. Preferred polymers include a biphenylene moiety. Other preferred polymers include a naphthalene moiety. Preferred polymers include said electron rich, non-deactivated, easily sulphonatable unit bonded to two oxygen atoms. Especially preferred polymers include a —O-biphenylene-O— moiety. Other especially preferred polymers include a —O-naphthalene-O— moiety.

Preferred first conductive polymers include a first type of moiety which is relatively difficult to sulphonate and a second type of moiety which is relatively easy to sulphonate. For example, said second moiety may be sulphonatable using the relatively mild method described in Example 6 hereinafter, whereas the first moiety may be substantially non-sulphonatable in such a method. The use of the method of Example 6 may be advantageous over currently used methods which use oleum. A preferred second said moiety includes a moiety -$Ph_n$- wherein n is an integer of at least 2. Said moiety is preferably bound to at least one ether oxygen. Especially preferred is the case wherein said moiety is —O-$Ph_n$-O— where said ether groups are para to the Ph—Ph bond.

Preferred first conductive polymers are copolymers comprising, preferably consisting essentially of, a first repeat unit which is selected from those described below:

(a) a unit of formula IV wherein E and E' represent oxygen atoms, G represents a direct link, Ar represents a moiety of structure (iv), m and s represent zero, w represents 1 and A and B represent 1;

(b) a unit of formula IV wherein E represents an oxygen atom, E' represents a direct link, Ar represents a moiety of structure (i), m represents zero, A represents 1, B represents zero;

(c) a unit of formula V wherein E and E' represent oxygen atoms, G represents a direct link, Ar represents a moiety of structure (iv), m and v represent zero, z represents 1 and C and D represent 1;

(d) a unit of formula V wherein E represents an oxygen atom, E' represents a direct link, Ar represents a moiety of structure (ii), m represents O, C represents 1, D represents 0; or (e) a unit of formula V wherein E and E' represents an oxygen atom, Ar represents a structure (i), m represents O, C represents 1, Z represents 1, G represents a direct link, v represents 0 and D represents 1;

Other preferred first repeat units include:

(aa) a unit of formula IV wherein E represents an oxygen atom, E' represents a direct link, Ar represents a structure (i)*, m represents 0, A represents 1, B represents 0;

(bb) a unit of formula IV wherein E and E' represent oxygen atoms, Ar represents a structure (iv), m and w represent 0, G represents a direct link, s and r represent 1, A and B represent 1;

(cc) a unit of formula IV wherein E and E' represent oxygen atoms, Ar represents a structure (i), m and w represent 0, G represents a direct link, s and r represent 1, A and B represent 1;

and a second repeat unit which is selected from the following:

(f) a unit of formula IV wherein E and E' represent oxygen atoms, G represents a direct link, Ar represents a moiety of structure (iv), m represents 1, w represents 1, s represents zero, A and B represent 1;

(g) a unit of formula IV wherein E represents an oxygen atom, E' is a direct link, G represents a direct link, Ar represents a moiety of structure (iv), m and s represent zero, w represent 1, A and B represent 1;

(h) a unit of formula V wherein E and E' represent oxygen atoms, G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct link, Ar represents a moiety of structure (iv), m and v represent zero, z represents 1, C and D represent 1;

Other second units which may form copolymers with any of said first repeat units (a) to (e) (and/or with units (aa), (bb) and (cc)) above include: a unit of formula IV wherein E and E' represent oxygen atoms, G represents a direct link, Ar represents a moiety of structure (v), m represents 0, w represents 1, s represents 0, A and B represent 1; or a unit of formula V wherein E and E' represent oxygen atoms, G represents a direct link, Ar represents a moiety of structure (v), m represents 0, z represents 1, v represents 0, C and D represent 1.

Preferred first conductive polymers for some situations may comprise first units selected from (a), (b), (c) and (e) and second units selected from (f), (g), (h) or (i). A polymer comprising units (d) and (h) may also be preferred. In some situations, first units may be selected from (aa), (bb) and (cc) and second units selected from (f), (g), (h) or (i).

More preferred first conductive polymers are copolymers having a first repeat unit selected from those described above, especially repeat units (b), (d) or (e) in combination with a second repeat unit selected from units (f) or (h). Other particularly preferred polymers are copolymers having a first repeat unit selected from (aa) and (bb) in combination with a second repeat unit selected from units (f) or (h).

In some situations, a difficult to sulphonate unit may include at least one relatively strongly electron-withdrawing group (e.g. —CO— or —$SO_2$— group) bonded to a phenyl group. Such a unit will be more difficult to sulphonate compared to, for example, a unit having a phenyl group not bonded to such a strongly electron-withdrawing group. Thus, in this case, a copolymer comprising a unit (a) or (c) in combination with difficult to sulphonate units as described may be prepared. Preferred copolymers of this type may comprise first (difficult to sulphonate) repeat unit(s) of formula (b) and/or (d) together with second relatively easy to sulphonate) unit(s) of formula (a) and/or (c). Especially preferred copolymers comprise, preferably consist essentially of a first (difficult to sulphonate) repeat unit of formula (b) or (d) together with a second (relatively easy to sulphonate) unit of formula (a) or (c).

Preferred polymers having repeat unit(s) of formulae IV* and V* may include: a unit of formula IV* wherein Ar represents a moiety of structure (v), E represents a direct link, E' represents an oxygen atom, G represents a direct link, w, s and m represent 0, A and B represent 1; and/or a repeat unit of formula V* wherein Ar represents a moiety of structure (v), E represents a direct link, E' represents an oxygen atom, G represents a direct link, z, v and m represent 0, C and D represent 1.

Said polymers having repeat units IV* and V* may include any of repeat units (a) to (i) (and/or units (aa), (bb) and (cc)) described above.

In some situations, polymers which include at least one repeat unit of formula IV or formula IV* may be preferred.

Copolymers may be prepared having one or more first repeat units and one or more of said second repeat units.

Said copolymers may be random or block copolymers.

Where said first conductive polymer is a copolymer as described, the mole % of co-monomer units, for example said first and second repeat units described above, may be varied to vary the solubility of the polymer in solvents, for example in organic solvents which may be used in the preparation of films and/or membranes from the polymers and/or in other solvents, especially water.

One class of first conductive polymers may comprise sulphonated homopolymers, examples of which include sulphonated polyetheretherketone, polyetherketone, polyetherketoneketone, polyetheretherketoneketone, polyetherketoneetherketoneketone, polyetherdiphenyletherketone and polyether-napthaleneether-phenyl-ketone-phenyl.

Preferred first conductive polymers suitably have a solubility of at least 10% w/v, preferably a solubility in the range 10 to 30% w/v in a polar aprotic solvent, for example NMP, DMSO or DMF. Preferred polymers are substantially insoluble in boiling water.

First units of the type described above (with the exception of units (a) and (c)) may be relatively difficult to sulphonate, whereas second units of the type described may be easier to sulphonate.

Where a phenyl moiety is sulphonated, it may only be mono-sulphonated. However, in some situations it may be possible to effect bi- or multi-sulphonation.

In general terms, where a said polymer includes a —O-phenyl-O— moiety, up to 100 mole % of the phenyl moieties may be sulphonated. Where a said polymer includes a —O-biphenylene-O— moiety, up to 100 mole % of the phenyl moieties may be sulphonated. It is believed to be possible to sulphonate relatively easily —O-(phenyl)$_n$-O— moieties wherein n is an integer, suitably 1–3, at up to 100 mole %. Moieties of formula —O-(phenyl)$_n$-CO— or —O-(phenyl)$_n$-SO$_2$— may also be sulphonated at up to 100 mole % but more vigorous conditions may be required. Moieties of formulae —CO-(phenyl)$_n$-CO— and —SO$_2$-(phenyl)$_n$-SO$_2$— are more difficult to sulphonate and may be sulphonated to a level less than 100 mole % or not at all under some sulphonation conditions.

The glass transition temperature ($T_g$) of said polymer may be at least 144° C., suitably at least 150° C., preferably at least 154° C., more preferably at least 160° C., especially at least 164° C. In some cases, the Tg may be at least 170° C., or at least 190° C. or greater than 250° C. or even 300° C.

Said first conductive polymer may have an inherent viscosity (IV) of at least 0.1, suitably at least 0.3, preferably at least 0.4, more preferably at least 0.6, especially at least 0.7 (which corresponds to a reduced viscosity (RV) of least 0.8) wherein RV is measured at 25° C. on a solution of the polymer in concentrated sulphuric acid of density 1.84 gcm$^{-3}$, said solution containing 1 g of polymer per 100 cm$^{-3}$ of solution. IV is measured at 25° C. on a solution of polymer in concentrated sulphuric acid of density 1.84 gcm$^3$, said solution containing 0.1 g of polymer per 100 cm$^3$ of solution.

The measurements of both RV and IV both suitably employ a viscometer having a solvent flow time of approximately 2 minutes.

The main peak of the melting endotherm (Tm) for said polymer (if crystalline) may be at least 300° C.

In general terms, said first conductive polymer is preferably substantially stable when used as a PEM in a fuel cell. Thus, it suitably has high resistance to oxidation, reduction and hydrolysis and has very low permeability to reactants in the fuel cell. Preferably, however, it has a high proton conductivity. Furthermore, it suitably has high mechanical strength and is capable of being bonded to other components which make up a membrane electrode assembly.

Said first conductive polymer may comprise a film, suitably having a thickness of less than 1 mm, preferably less than 0.5 mm, more preferably less than 0.1 mm, especially less than 0.05 mm. The film may have a thickness of at least 5 μm.

Said polymer electrolyte membrane may comprise one or more layers wherein, suitably, at least one layer comprises a film of said polymer. Said membrane may have a thickness of at least 5 μm and, suitably, less than 1 mm, preferably less than 0.5 mm, more preferably less than 0.1 mm, especially less than 0.05 mm.

It may be preferable for each phenyl group in a sulphonated polymer as described to be deactivated by being bonded directly to an electron withdrawing group, for example a sulphonated group, a sulphone group or a ketone group.

In one preferred embodiment, said first conductive polymer may include: polyaryletherketone and/or polyarylethersulphone units; and units of formula —O-Ph$_n$-O— (XX) wherein Ph represents a phenyl group and n represents an integer of 2 or greater and wherein Ph groups of units (XX) are sulphonated.

The use of support material as described may allow polymers of lower equivalent weights (EW) for example less than 500 g/mol, less than 450 g/mol or even less than 400 g/mol or 370 g/mol or relatively inflexible or brittle polymers to be used in polymer electrolyte membranes.

Said first conductive polymer could be a component of a blend, wherein said blend is supported by said support material. Such a blend may include more than one type of conductive polymer, for example more than one type of first conductive polymer described herein. Alternatively, a blend may include said first conductive polymer and a non-conductive polymer. Where a blend is used, the blend suitably includes at least 45 wt %, preferably at least 50 wt %, more preferably at lest 75 wt %, especially at least 95 wt % of said first conductive polymer. Preferably, said first conductive polymer is not a component of a blend, for example of the type described.

Said second conductive polymer may be selected from any of the materials described above for said first conductive polymer. Preferably, said second conductive polymer is not simply surface sulphonated but the bulk of the material is sulphonated. Thus, the concentration of ion-exchange sites is preferably not concentrated at the surface of the material but are distributed substantially throughout the material. Consequently, it is preferred to prepare said second conductive material (ie incorporating said ion-exchange sites) and then form said material into a support material, for example by casting.

The second conductive material may be distinguished from surface sulphonated materials by the conductivity. Suitably, said second conductive material has an EW of less than 2000, preferably less than 1600, more preferably less than 1200, especially less than 1000. In some cases, EW may be less than 800, 600 or even 500.

In some cases, said second conductive material may have relatively low conductivity, for example EW about 1500. In other cases, the conductivity of said second conductive material may be relatively high (e.g. EW about 300). Thus, preferably, the EW of said second conductive material is in the range 300–1500. More preferably, it is in the range 400–1000.

Said second conductive polymer preferably has at least some crystallinity—that is, it is preferably semi-crystalline.

The existence and/or extent of crystallinity in a polymer is preferably measured by wide angle X-ray diffraction, for example as described by Blundell and Osborn (Polymer 24, 953, 1983). The assessment of crystallinity may also be undertaken using Differential Scanning Calorimetry. The level of crystallinity in said second ion-conducting polymeric material may be at least 1%, is suitably at least 5%, is preferably at least 10%, is more preferably at least 15% and, especially, is at least 20% weight fraction, suitably when measured as described by Blundell and Osborn.

Said second conductive polymer preferably includes a repeat unit which suitably includes aromatic group containing moieties linked by —CO— and/or -Q- groups, where Q represents —O— or —S—, but does not include —$SO_2$— groups since such would tend to render the unit amorphous. Said repeat unit preferably does not include any units whose shape and/or conformation is/are incompatible with the crystalline conformation adopted by polyetherketone units.

Said conductive polymer may include a second crystalline unit which is of general formula IV or IV* as described above, provided said unit is crystallisable. Suitably, to be crystallisable, said second unit does not include any Ar group of formula (ii), (viii), (ix) or (x). More preferably, it may also not include an Ar group of formula (v), (vi) or (vii). Preferred Ar groups consist of one or more phenyl groups in combination with one or more carbonyl and/or ether groups.

Examples of crystallisable repeat units that may be included in said second conductive polymer are shown in FIG. 2.

Said support material may comprise at least 30 wt %, suitably at least 45 wt %, preferably at least 50 wt %, more preferably at least 75 wt %, especially at least 95 wt % of said second conductive polymer. Said support material may consist essentially of said second-conductive polymer. Alternatively, said support material may comprise a blend of polymers wherein more than one type of conductive polymer is provided in the blend or a blend may include a conductive polymer of the type described and a non-conductive polymer. Examples of non-conductive polymers include polyaryletherketones and polyarylethersulphones, with specific examples being polyetheretherketone, polyetherketone and polyethersulphone.

Said composite membrane suitably incorporates a catalyst material, preferably a layer of a catalyst material which is suitably a platinum catalyst (e.g. platinum containing catalyst) or a mixture of platinum and ruthenium, on both sides of the composite membrane. Electrodes may be arranged outside the catalyst material.

Polymers having units I, II, III, IV, IV*, V and/or V* may be prepared by:

(a) polycondensing a compound of general formula

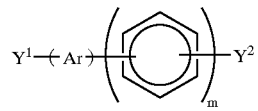

VI with itself wherein $Y^1$ represents a halogen atom or a group -EH and $Y^2$ represents a halogen atom or, if $Y^1$ represents a halogen atom, $Y^2$ represents a group E'H; or (b) polycondensing a compound of general formula

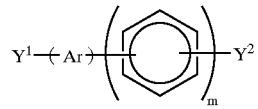

VI with a compound of formula

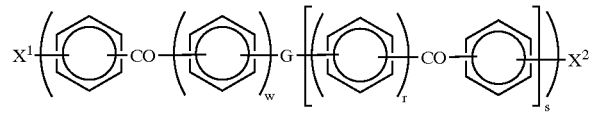

VII and/or with a compound of formula

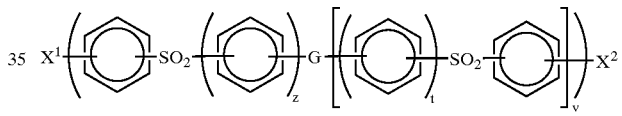

VIII wherein $Y^1$ represents a halogen atom or a group -EH (or -E'H if appropriate) and $X^1$ represents the other one of a halogen atom or group -EH (or -E'H if appropriate) and $Y^2$ represents a halogen atom or a group -E'H and $X^2$ represents the other one of a halogen atom or a group -E'H (or -EH if appropriate).

(c) optionally copolymerizing a product of a process as described in paragraph (a) with a product of a process as described in paragraph (b);

wherein the phenyl moieties of units VI, VII and/or VIII are optionally substituted; the compounds VI, VII and/or VIII are optionally sulphonated; and Ar, m, w, r, s, z, t, v, G, E and E' are as described above except that E and E' do not represent a direct link;

the process also optionally comprising sulphonating and/or cross-linking a product of the reaction described in paragraphs (a), (b) and/or (c) to prepare said polymer.

In some situations, the polymer prepared, more particularly phenyl groups thereof, may be optionally substituted with the groups hereinabove described after polymer formation.

Preferably, where $Y^1$, $Y^2$, $X^1$ and/or $X^2$ represent a halogen, especially a fluorine, atom, an activating group, especially a carbonyl or sulphone group, is arranged ortho- or para- to the halogen atom.

Preferred halogen atoms are fluorine and chlorine atoms, with fluorine atoms being especially preferred. Preferably, halogen atoms are arranged meta- or para- to activating groups, especially carbonyl groups.

Where the process described in paragraph (a) is carried out, preferably one of $Y^1$ and $Y^2$ represents a fluorine atom and the other represents an hydroxy group. More preferably in this case, $Y^1$ represents a fluorine atom and $Y^2$ represents an hydroxy group. Advantageously, the process described in paragraph (a) may be used when Ar represents a moiety of structure (i) and m represents 1.

When a process described in paragraph (b) is carried out, preferably, $Y^1$ and $Y^2$ each represent an hydroxy group. Preferably, $X^1$ and $X^2$ each represent a halogen atom, suitably the same halogen atom.

The polycondensation reactions described are suitably carried out in the presence of a base, especially an alkali metal carbonate or bicarbonate or a mixture of such bases. Preferred bases for use in the reactions include sodium carbonate and potassium carbonate and mixtures of these.

The identity and/or properties of the polymers prepared in a polycondensation reaction described may be varied according to the reaction profile, the identity of the base used, the temperature of the polymerisation, the solvent(s) used and the time of the polymerisation Also, the molecular weight of a polymer prepared may be controlled by using an excess of halogen or hydroxy reactants, the excess being, for example, in the range 0.1 to 5.0 mole %.

In a polymer prepared in a said polycondensation reaction involving compounds of general formula VI, VII and/or VIII, moieties of general formula VI, VII and/or VIII (excluding end groups $Y^1$, $Y^2$, $X^1$ and $X^2$) may be present in regular succession (that is, with single units of one said moiety, separated by single units of another said moiety or moieties), or semi-regular succession (that is, with single units of one said moiety separated by strings of another moiety or moieties which are not all of the same length) or in irregular succession (that is, with at least some multiple units of one moiety separated by strings of other moieties that may or may not be of equal lengths). The moieties described are suitably linked through ether or thioether groups.

Also, moieties in compounds VI, VII and/or VIII arranged between a pair of spaced apart —O— atoms and which include a -phenyl-$SO_2$ or -phenyl-CO— bonded to one of the —O— atoms may, in the polymer formed in the polycondensation reaction, be present in regular succession, semi-regular succession or in irregular succession, as described previously.

In any sampled polymer, the chains that make up the polymer may be equal or may differ in regularity from one another, either as a result of synthesis conditions or of deliberate blending of separately made batches of polymer.

Compounds of general formula VI, VII and VIII are commercially available (eg from Aldrich U.K.) and/or may be prepared by standard techniques, generally involving Friedel-Crafts reactions, followed by appropriate derivatisation of functional groups. The preparations of some of the monomers described herein are described in P M Hergenrother, B J Jensen and S J Havens, Polymer 29, 358 (1988), H R Kricheldorf and U Delius, Macromolecules 22, 517 (1989) and P A Staniland, Bull, Soc, Chem, Belg., 98 (9–10), 667 (1989).

Where compounds VI, VII and/or VIII are sulphonated, compounds of formulas VI, VII and/or VIII which are not sulphonated may be prepared and such compounds may be sulphonated prior to said polycondensation reaction.

Sulphonation as described herein may be carried out in concentrated sulphuric acid (suitably at least 96% w/w, preferably at least 97% w/w, more preferably at least 98% w/w; and preferably less than 98.5% w/w) at an elevated temperature. For example, dried polymer may be contacted with sulphuric acid and heated with stirring at a temperature of greater than 40° C., preferably greater than 55° C., for at least one hour, preferably at least two hours, more preferably about three hours. The desired product may be caused to precipitate, suitably by contact with cooled water, and isolated by standard techniques. Sulphonation may also be effected as described in U.S. Pat. No. 5,362,836 and/or EP0041780.

According to another aspect of the invention, there is provided a method of making a composite material, for example a composite membrane, the method comprising causing a first conductive polymer to be associated with a support material which comprises a second conductive polymer, thereby to produce a composite membrane comprising said first conductive polymer and said support material.

The method preferably includes the step of contacting said first conductive polymer and said second conductive polymer and subjecting the materials to treatments whereby a composite membrane in which said first and second polymers are integral parts is formed.

The method preferably includes the step of contacting the support material with a first solvent which solubilises, to some degree, the support material. Said solvent may be capable of dissolving the support material to a level of at least 5 wt %. Said solvent is preferably not a polar aprotic organic solvent, such as NMP. Said solvent is preferably a protic solvent. Said solvent preferably comprises or consists essentially of a strong acid solvent. Said solvent may comprise at least 90%, preferably at least 95%, more preferably at least 97%, especially at least 98% acid. Said strong acid solvent may be one or more of sulphuric acid, a sulphonic acid (e.g. methane sulphonic acid, trichloromethane sulphonic acid, trifluoromethane sulphonic acid), hydrofluoric acid and phosphoric acid. Said first solvent and said support material are preferably selected so that said first solvent does not functionalise the support material to provide ion-exchange sites, for example sulphonate groups. Thus, preferably, said first solvent and said support material are selected so that said first solvent does not sulphonate the support material.

In one embodiment, the method may involve said support material, suitably comprising sulphonated aromatic ether ketone polymers or copolymers or aromatic ether ketone/ether sulphone copolymers, being dissolved in said first solvent. Then, a second solvent is used to cause pores to be formed in said support material. Next, a solution which includes the first conductive polymer, suitably comprising aromatic ether ketone polymer or copolymer or aromatic ether ketone/ether sulphone copolymer, is contacted with said porous support material. A third solvent used to form the solution of the first conductive polymer preferably does not substantially dissolve said support material. Thereafter, the third solvent is evaporated. Advantageously, the porous support material will have a low water absorption even at high temperature and, accordingly, will not swell, but will retain its mechanical strength. Nevertheless, both the support material and the first conductive polymer are ion-conducting.

Preferably, said first solvent comprises or consists essentially of sulphuric acid. Said solvent may include at least 96%, preferably at least 98% acid. Said solvent may include less than 99% acid.

In general, the method preferably includes the step of contacting the support with a second solvent after said support has been contacted with said first solvent. Said second solvent is preferably arranged to cause phase inversion. Phase inversion suitably results in said support material being rendered porous, suitably defining an asymmetric microporous membrane. Said second solvent is preferably a non-solvent for said support material. Preferred second solvents are aqueous; and examples include water and dilute acids.

Said first conductive polymer is preferably caused to penetrate pores formed in said support material. Said first conductive polymer, in a third solvent, is preferably contacted with said porous support material. Said third solvent is preferably incapable of functionalising the support material to provide ion-exchange sites thereon. Said first conductive polymer may be provided as a solution in the third solvent. Where said first conductive polymer is a component of a blend, another component or components of the blend may be substantially soluble or insoluble in the third solvent. Preferably, said support material is not substantially solubilised by said third solvent. Preferably, said support material is substantially insoluble in said third solvent. Said third solvent is preferably not a strong acid. Said third solvent may be an aprotic solvent, especially a polar aprotic solvent. Said third solvent is preferably organic. It may be an alcohol or a mixture of aprotic solvent and alcohol.

Where said first conductive polymer comprises moieties I, II and/or III described above, said third solvent is preferably a polar aprotic solvent, especially NMP. Where said first conductive polymer is a perfluorinated ionomer then the third solvent may be an alcohol.

The ratio of the EW of the first conductive polymer to the second conductive polymer may be in the range 0.5 to 2.

In one embodiment, the method may involve said support material, suitably comprising polyetheretherketone, polyetherketone, polyetheretherketoneketone, polyetherketoneketone or polyetherketoneetherketoneketone, sulphonated to a level at which they do not swell excessively in water, being dissolved in said first solvent. Then, the second solvent is used to cause pores to be formed in said support material. Next, a solution of the first conductive polymer, (which may be any of the first conductive polymers described herein, but preferably includes moieties I, II or III described above and may bepolyetheretherketone, polyetherketone, polyetheretherketoneketone, polyetherketoneketone or polyetherketoneetherketoneketone, is contacted with said porous support material. The third solvent used to form the solution of the first conductive polymer preferably does not substantially dissolve said support material. Thereafter, the third solvent is evaporated. Advantageously, the porous support material will have a low water absorption even at high temperature and, accordingly, will not swell, but will retain its mechanical strength. Nevertheless, both the support material and the first conductive polymer are ion-conducting.

In another embodiment, sulphonated support material may be precipitated directly from a medium used to sulphonate an (unsulphonated) polymer which, when sulphonated, provides said second conductive polymer. Thus, the method preferably includes a step of contacting an unsulphonated polymer (which when sulphonated is to provide said conductive polymer of the support material) with a sulphonating solvent (e.g. sulphuric acid) thereby sulphonate the polymer. Then, the sulphonated polymer in said sulphonating solvent is laid down as a film and contacted with a solvent arranged to cause phase inversion of the film, suitably to define a microporous membrane. The microporous membrane may be impregnated with first conductive polymers as described herein.

The pore size of the support material produced by phase inversion can be controlled. In this regard, said first solvent may include a small amount of a non-solvent, typically less than 10% of a non-solvent, for example water or an organic liquid (e.g. acetophenone). This may impair the solvency slightly and affect the pore sizes. By producing a suitable pore size, the composite membrane may act as a "Reverse Osmosis" membrane, allowing the passage of protons and water, but preventing the passage of organic molecules, such as methanol or hydrocarbons. A composite membrane of such a structure could reduce methanol cross-over in Direct Methanol Fuel Cells.

In an embodiment wherein the support material comprises a blend of polymers, one of which is said second conductive polymer, one of the polymers in the blend may be at least partially soluble in the third solvent which comprises the first conductive polymer. Consequently, the first conductive polymer may penetrate the support material, suitably in regions thereof which are solubilised by the third solvent. By way of example, a support material may be a blend of a second conductive polymer (which is a copolymer of sulphonated etherdiphenyletherketone and etherketone) and polyethersulphone (which is soluble in NMP). The first conductive polymer, dissolved in NMP, may be contacted with the aforesaid support material whereby the polyethersulphone thereof may be dissolved allowing penetration of the first conductive polymer into dissolved regions.

In general terms, wherein the support material comprises a blend of polymers, one of which is said second conductive polymer, said second conductive polymer and the polymer or polymers with which said second conductive polymer is blended are preferably selected so that a said first solvent used to cast the support material does not functionalise the support material to provide ion-exchange sites when contacted therewith. Examples of polymers with which said second conductive polymer may be blended include polyaryletherketones; polyarylethersulphones; polyetheretherketone (when methane sulphonic acid is used as said first solvent); polyetherketone; and polyethersulphone (when concentrated sulphuric acid is used as said first solvent).

In a specific example, a blend may comprise the sulphonated polymer from Example 6a hereinafter with approximately 10 wt % of polethersulphone. The blend may be dissolved in concentrated sulphuric acid and a microporous membrane made. Thereafter, the membrane may be impregnated with an NMP solution of the sulphonated polymer from Example 6d hereinafter. In another specific example, a microporous membrane prepared from the polymer of Example 6a may be impregnated with an NMP solution of a blend comprising the sulphonated polymer from Example 6d and 10% wt polyethersulphone.

The following further utilities for the composite membrane are also contemplated:

1. Proton exchange membrane based water electrolysis, which involves a reverse chemical reaction to that employed in hydrogen/oxygen electrochemical fuel cells.
2. Chloralkali electrolysis, typically involving the electrolysis of a brine solution to produce chlorine and sodium hydroxide, with hydrogen as a by-product.
3. Electrode separators in conventional batteries due to the chemical inertness and high electrical conductivity of the composite membranes.
4. Ion-selective electrodes, particularly those used for the potentiometric determination of a specific ion such as $Ca^{2+}$, $Na^+$, $K^+$ and like ions. The composite membrane could also be employed as the sensor material for humidity sensors, as the electrical conductivity of an ion exchange membrane varies with humidity.

5. Ion-exchange material for separations by ion-exchange chromatography. Typical such applications are deionization and desalination of water (for example, the purification of heavy metal contaminated water), ion separations (for example, rare-earth metal ions, trans-uranium elements), and the removal of interfering ionic species.
6. Ion-exchange membranes employed in analytical preconcentration techniques (Donnan Dialysis). This technique is typically employed in analytical chemical processes to concentrate dilute ionic species to be analysed.
7. Ion-exchange membranes in electrodialysis, in which membranes are employed to separate components of an ionic solution under the driving force of an electrical current. Electrolysis applications include the industrial-scale desalination of brackish water, preparation of boiler feed make-up and chemical process water, de-ashing of sugar solutions, deacidification of citrus juices, separation of amino acids, and the like.
8. Membranes in dialysis applications, in which solutes diffuse from one side of the membrane (the feed side) to the other side according to their concentration gradient. Separation between solutes is obtained as a result of differences in diffusion rates across the membrane arising from differences in molecular size. Such applications include hemodialysis (artificial kidneys) and the removal of alcohol from beer.
9. Membranes in gas separation (gas permeation) and pervaporation (liquid permeation) techniques.
10. Bipolar membranes employed in water splitting and subsequently in the recovery of acids and bases from waste water solutions.

The method may include a subsequent step of associating a catalyst material with the composite membrane prepared as described.

A said composite membrane described herein may be used in fuel cells or electrolysers and, accordingly, the invention extends to a fuel cell or electrolyser incorporating a composite membrane as described. The membrane may be used in Hydrogen Fuel Cells or Direct Methanol Fuel Cells. The membrane may also be used in filtration (as parts of filtration membranes), for example in ultrafiltration, microfiltration, or in reverse osmosis. The most preferred use is in a fuel cell as described.

Any feature of any aspect of any invention or embodiment described herein may be combined with any feature of any aspect of any other invention or embodiment described herein.

BRIEF DESCRIPTION OF THE DRAWINGS

Specific embodiments of the invention will now be described, by way of example, with reference to FIG. 1 which is a schematic representation of a polymer electrolyte membrane fuel cell.

Figure 1:
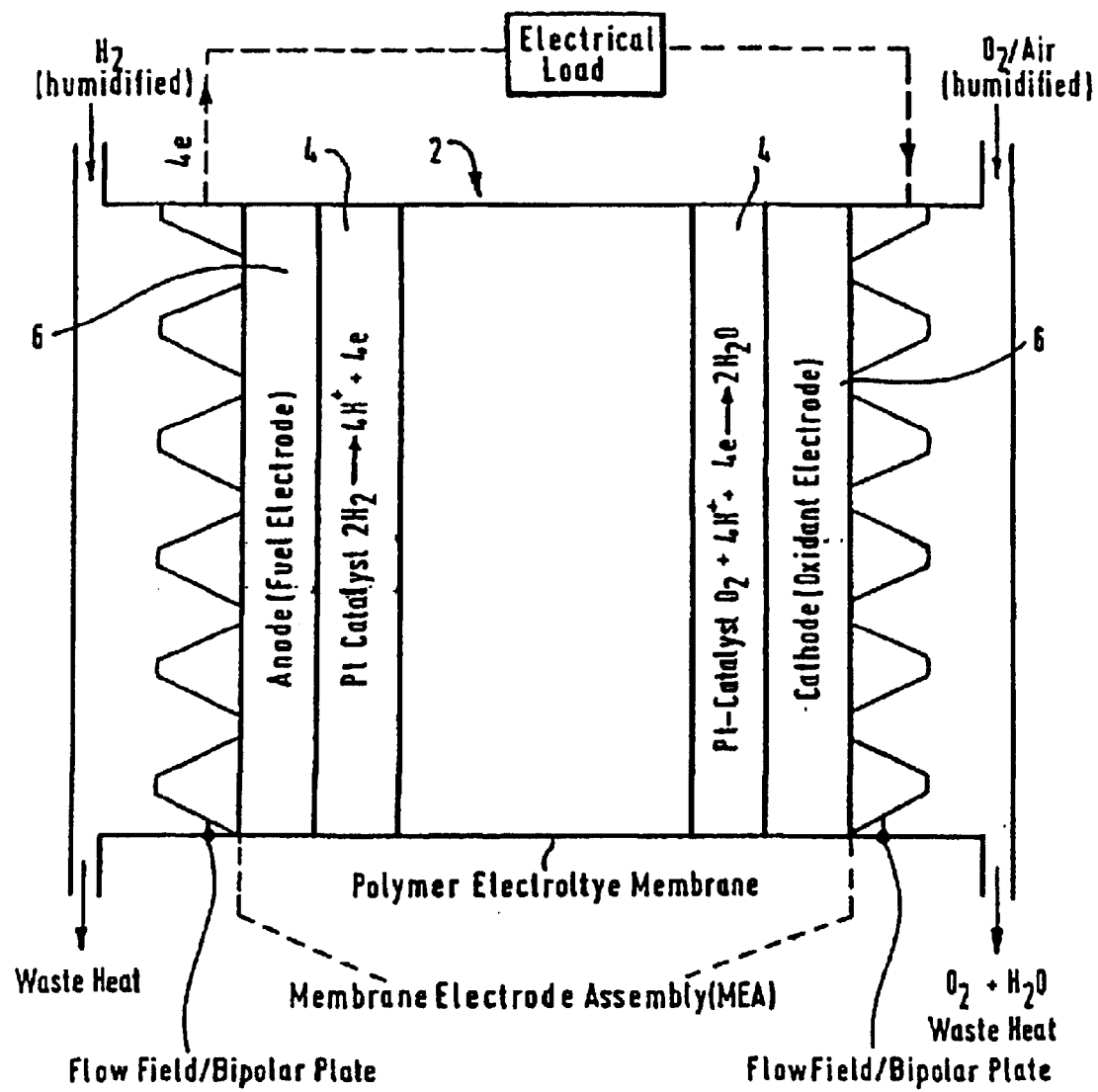
Figure 2:
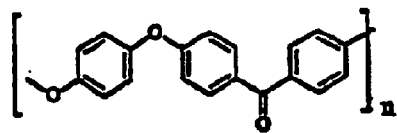
FIG. 2 which shows some repeat units that may be included in conductive polymers.
Figure 2:
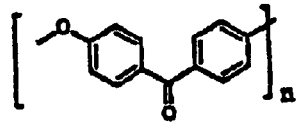
Figure 2:
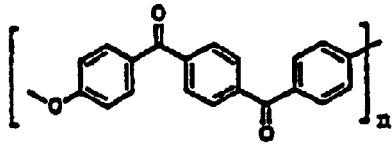
Figure 2:
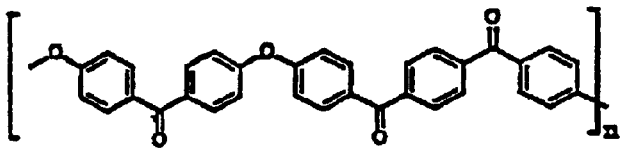
Figure 2:
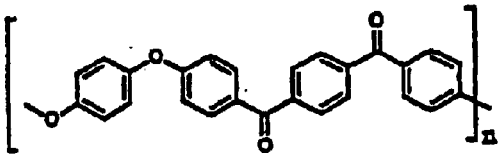
Figure 2:
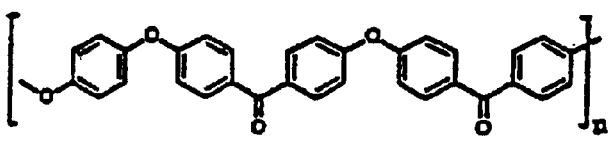
Figure 2:
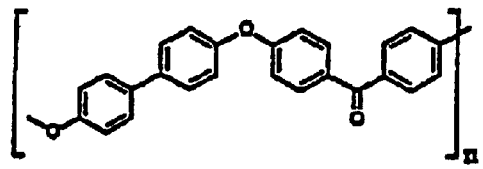
Figure 3B:
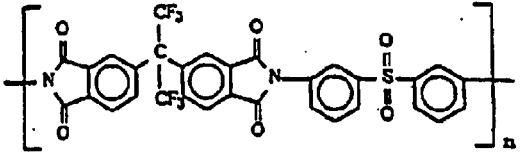
FIG. 3 gives examples of some first conductive polymers described above.
Figure 3B:
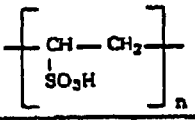
Figure 3B:
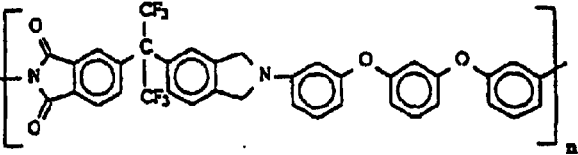
Figure 3B:
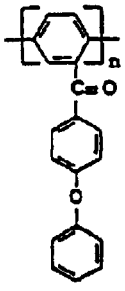
Figure 3B:
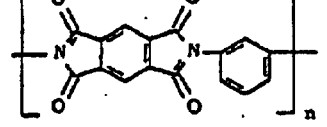
Figure 3B:
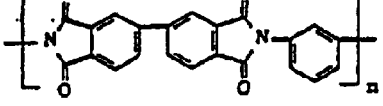
Figure 3B:
Figure 3B:
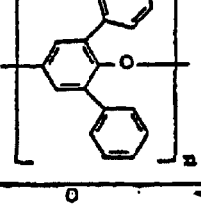
Figure 3B:
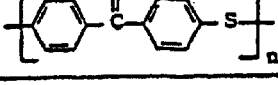

Unless otherwise stated, all chemicals referred to hereinafter were used as received from Sigma-Aldrich Chemical Company, Dorset, U.K.

EXAMPLES

Example 1

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (24.58 g, 0.132 mole) 4,4'-dihydroxybenzophenone (57.41 g, 0.268 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 315° C. over 2 hours then maintained for 1 hours.

The reaction mixture was allowed to cool, milled and washed with acetone and water. The resulting polymer was dried in an air oven at 120° C. The polymer had a melt viscosity at 400° C., 1000 sec$^{-1}$ of 0.54 kNsm$^{-2}$.

Example 2

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (18.62 g, 0.10 mole) 4,4'-dihydroxybenzophenone (64.26 g, 0.30 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 315° C. over 2 hours then maintained for 1 hours.

The reaction mixture was allowed to cool, milled and washed with acetone and water. The resulting polymer was dried in an air oven at 120° C. The polymer had a melt viscosity at 400° C., 1000 sec$^{-1}$ of 0.43 kNsm$^{-2}$.

Example 3

A 700 ml flanged flask fitted with a ground glass Quickfit lid, stirrer/stirrer guide, nitrogen inlet and outlet was charged with 4,4'-difluorobenzophenone (89.03 g, 0.408 mole), hydoquinone (25.17 g, 0.229 mole) 4,4'-dihydroxybenzophenone (36.72 g, 0.171 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (42.44 g, 0.40 mole) and dried potassium carbonate (1.11 g, 0.008 mole) was added. The temperature was raised gradually to 315° C. over 2 hours then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.39 kNsm$^{-2}$.

Example 4

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (29.79 g, 0.16 mole) 4,4'-dihydroxydiphenylsulphone (60.06 g, 0.24 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 315° C. over 3 hours then maintained for 0.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.6 kNsm$^{-2}$.

Example 5

A 700 ml flanged flask fitted with a ground glass Quickfit lid, stirrer/stirrer guide, nitrogen inlet and outlet was charged with 4,4'-dichlorodiphenylsulphone (104.25 g, 0.36 mole), 4,4'-dihydroxybiphenyl (22.32 g, 0.12 mole) 4,4'-dihydroxydiphenylsulphone (60.06 g, 0.24 mole), and diphenysulphone (245 g) and purged with nitrogen for over 1 hour. The contents were then heated under a nitrogen blanket to between 140 and 145° C. to form an almost colourless solution. While maintaining a nitrogen blanket, dried potassium carbonate (50.76 g, 0.37 mole) was added. The temperature was raised to 180° C., held for 0.5 hours, raised to 205° C., held for 1 hour, raised to 225° C., held for 2 hours, raised to 265° C., held for 0.5 hours, raised to 280° C. and held for 2 hours.

The reaction mixture was allowed to cool, milled and washed with acetone/methanol (30/70) and water. The resulting polymer was dried in an air oven at 120° C. The polymer had a Tg of 198° C. and a RV of 0.52.

Example 6

General Procedure for Sulphonating Polymers of Examples 1 to 5

The polymers of Examples 1–5 were sulphonated by stirring each polymer in 98% sulphuric acid (3.84 g polymer/100 g sulphuric acid) for 21 hours at 50° C. Thereafter, the reaction solution was allowed to drip into stirred deionised water. Sulphonated polymer precipitated as free-flowing beads. Recovery was by filtration, followed by washing with deionised water until the pH was neutral and subsequent drying.

In general, H$^1$nmr in DMSO-d$^6$ or titration confirmed that 100 mole % of the biphenyl units had sulphonated, giving one sulphonic acid group, ortho to the ether linkage, on each of the two aromatic rings comprising the biphenyl unit. The results are summarised in the table below.

| Example | Polymer from Example | Theoretical EW | Measured EW |
|---|---|---|---|
| 6a | 1 | 654 | 6.54 |
| 6b | 2 | 850 | 17.00 |
| 6c | 3.00 | 662 | 662[1] |
| 6d | 23.54 | 583 | 602[2] |
| 6e | 26.54 | 744 | 744[1] |

[1] $^1$H NMR
[2] Titration

Example 7

Preparation of Unreinforced Membrane

Membranes were produced from the polymer from Example 4 after sulphonation as described in Example 6 by dissolving the polymer in N-methylpyrrolidone (NMP) at a concentration of 15% w/w. The homogeneous solution was cast onto clean glass plates and then drawn down to give 400 micron films, using a stainless steel Gardner Knife. Evaporation at 100° C. under vacuum for 24 hours produced membranes of mean thickness 40 microns.

Example 8

General Procedure for Making Conductive Microporous Membranes Impregnated with Conducive Material A sulphonated polymer (selected from those described in Examples 1 and 2 and sulphonated as described in Example 6) was dissolved in 98% sulphuric acid, (10% w/w) and cast onto a glass plate to produce a 100 μm wet thickness coating. The plate was immersed in deionized water, removed, dried under vacuum at 105° C., thereby producing a microporous membrane. This membrane was then impregnated with a 15% (w/w) solution of the polymer prepared as described in Example 4 (and having been sulphonated as described in Example 6) in NMP to produce a wet thickness of the solution of 250 μm, followed by drying for 20 hrs at 105° C. The membranes prepared from the polymers described in Examples 1 and 2 are hereinafter referred to as Examples 8a and 8b respectively. The unreinforced membrane of Example 7 was highly swollen and fragile after immersion in boiling water for 1 hour, whereas the composite membranes of Examples 8a and 8b were strong and flexible.

Example 9

Assessment of Boiling Water Uptake

The following general procedure was followed to determine the boiling water uptake of membranes.

5 cm×5 cm samples of membrane from Examples 8a, 8b and 7 having thickness as described in the table below were separately immersed in boiling deionised water (500 ml) for 60 minutes, removed and dried quickly with lint-free paper to remove surface water, weighed, dried in an oven at 50° C. for 1 day, allowed to cool to ambient temperature in a desiccator, then weighed quickly. The % water-uptakes were calculated as described below.

$$\% \text{ Water-uptake} = \frac{\text{Wet Weight} - \text{Dry Weight}}{\text{Dry Weight}} \times 100$$

Results are provided in the table below.

| Example | Reinforcing Sulphonated Microporous Membrane | Sulphonated Impregnating Ion Conducting Membrane | Mean Membrane Final dry thickness (microns) | Weight Ratio Reinforcing Sulphonated Microporous Membrane: Sulphonated Impregnating Ion Conducting Membrane | Boiling Water Uptake (%) |
|---|---|---|---|---|---|
| 8a | Example 1 | Example 4 | 60 | 30:70 | 146 |
| 8b | Example 2 | Example 4 | 70 | 30:70 | 130 |
| 7 | NA | NA | 40 | NA | 520 |

Example 10

The polymer from Example 1 sulphonated as described in Example 6 was dissolved in 98% sulphuric acid then cast onto a glass plate to produce a 100 μm wet thickness coating. The plate was immersed in deionized water, removed, dried under vacuum at 105° C., thereby producing a microporous membrane. The membrane was then impregnated with a 5% (w/w) solution of Nafion (Trade Mark) (a perfluorosulphonic acid) in a mixture of lower alcohols and to produce a wet thickness of the solution of 300 μm, followed by drying for 20 hrs at 105° C. The unreinforced membrane was highly swollen and fragile after immersion in boiling water for 1 hour, whereas the composite membrane was strong and flexible.

Example 11

Polyetherketone (PEK™-P22, Victrex plc, Melt Viscosity 0.22 kNsm$^{-2}$) and the polymer from Example 1 sulphonated as described in Example 6 were separately dissolved in 98% sulphuric acid (7%w/w), blended in a ratio 1:1 then cast onto a glass plate to produce a 150 μm wet thickness coating. The plate was immersed in deionized water, removed, dried under vacuum at 105° C., thereby producing a microporous membrane. This membrane was then impregnated with a 15% (w/w) solution of the polymer prepared as described in Example 4 (and having been sulphonated as described in Example 6) in NMP to produce a wet thickness of the solution of 250 μm, followed by drying for 2 hrs at 105° C. The wet unreinforced membrane was highly swollen and fragile, whereas the wet composite membrane was strong and flexible, with the boiling water uptake being 520% and 110% respectively.

Example 12

The polymer from Example 1 sulphonated as described in Example 6 was dissolved in 98% sulphuric acid, (10%w/w) and cast onto a glass plate to produce a 100 μm wet thickness coating. The plate was immersed in deionized water, removed, dried under vacuum at 105° C., thereby producing a microporous membrane. This membrane was then impregnated with a 15% (w/w) solution of the polymer prepared as described in Example 5 and having been sulphonated as described in Example 6 in NMP to produce a wet thickness of the solution of 250 μm, followed by drying for 20 hrs at 105° C. The unreinforced membrane was highly swollen and fragile after immersion in boiling water for 1 hour, whereas the composite membrane was strong and flexible.

Example 13

The polymer from Example 1, sulphonated as described in Example 6, was dissolved in 98% sulphuric acid (10% w/w) and cast onto a glass plate to produce a 100 μm wet thickness coating. The plate was immersed in deionized water, removed, dried under vacuum at 105° C., thereby producing a microporous membrane. This membrane was then impregnated with a 15% (w/w) solution of the polymer prepared as described in Example 4 (and having been sulphonated as described in Example 6) in NMP to produce a wet thickness of the solution for Examples 13a, 13b and 13c, as described in the Table below. The unreinforced membrane (i.e. prepared from sulphonated polymer from Example 4 alone, as described in Example 7) was highly swollen and fragile after immersion in boiling water for 1 hour, whereas the composite membranes of Examples 13a, b, c were strong and flexible.

| Example | Sulphonated Impregnating Ion Conducting Membrane wet thickness | Mean Membrane Final dry thickness (microns) | Boiling Water Uptake (%) |
| --- | --- | --- | --- |
| Example 13a | 300 | 75 | 225.00 |
| Example 13b | 300.00 | 40 | 127 |
| Example 13c | 225.00 | 40 | 103 |
| Example 7d | 525.00 | 40 | 520 |

Example 14

Comparison of Fuel Cell Performance of Reinforced Composite Membrane Prepared in Example 8a with Unreinforced Membrane Prepared in Example 7

The reinforced composite membrane prepared in Example 8a and the unreinforced membrane prepared in Example 7 were pre-treated by boiling in 1M sulphuric acid, allowed to cool to room temperature followed by thorough washing with deionised water. Membrane Electrode Assemblies (MEA) were prepared using standard platinum loaded, Nafion® impregnated Gas Diffusion Electrodes (E-Tek, Elat 0.35 mg Pt cm$^{-2}$) hot pressed onto the membrane. The active area being 11.8 cm$^2$. The following operating conditions were followed:

| | |
| --- | --- |
| Hydrogen Pressure | 3 Barg |
| Air Pressure | 3 Barg |
| Hydrogen Stoichiometry | 1.5 |
| Air Stoichiometry | 3 |
| Cell Temperature | 60° C. |
| Current Density | 0.7 Acm$^{-2}$ |

The comparative voltages at current density of 0.8 Acm-2 for the unreinforced and reinforced membranes were 0.64 and 0.6V respectively.

The MEA using the unreinforced membrane was very fragile and required very careful handling, whereas the reinforced composite membrane was robust.

Example 15

The polymer from Example 1 was sulphonated by stirring it in 98% sulphuric acid (7.5% w/w) for 21 hours at 50° C. Thereafter, the reaction solution was allowed to cool to room temperature, cast onto a clean glass plate and then drawn down to produce a 150 μm wet thickness coating, using a stainless steel Gardner Knife. The plate was immersed in deionized water, removed, dried under vacuum at 105° C., thereby producing a microporous membrane. This membrane was then impregnated with a 15% (w/w) solution of the polymer prepared as described in Example 4 (and having been sulphonated as described in Example 5) in NMP to produce a wet thickness of the solution of 250 μm, followed by drying for 20 hrs at 105° C. The unreinforced membrane was highly swollen and fragile after immersion in boiling water for 1 hour, whereas the composite membrane was strong and flexible, with Boiling Water Uptakes of 520 and 160% respectively.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A composite material which comprises a first ion-conductive polymer and a support material for the polymer, wherein the support material comprises a second ion-conductive polymer, said support material defines a porous support and said first ion-conductive polymer impregnates the porous support.

2. A material according to claim 1, wherein said composite material is a composite membrane.

3. A material according to claim 1, wherein said first ion-conductive polymer comprises a thermoplastic or thermoset aromatic polymer, a polybenzazole or a polyaramid polymer, or a perfluorinated ionomer, each of which has been functionalized to provide ion-exchange sites; polystyrene sulphonic acid, polytrifluorostyrene sulphonic acid, polyvinyl phosphonic acid, polyvinyl carboxylic acid and polyvinyl sulphonic acid polymers, and metal salts thereof.

4. A material according to claim 1 wherein said first ion-conductive polymer is one having a moiety of formula

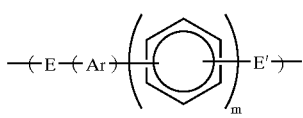

I and/or a moiety of formula

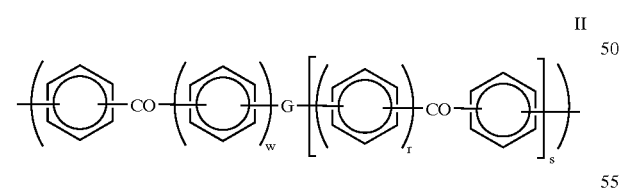

II and/or a moiety of formula

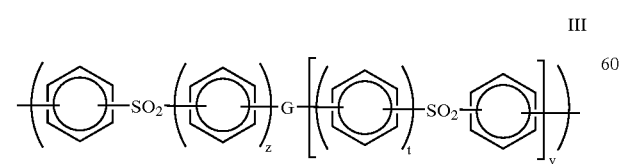

III wherein at least some of the units I, II and/or III are funtionalized to provide ion-exchange sites; wherein the phenyl moieties in units I, II, and III are independently optionally substituted and optionally cross-linked; and wherein m, r, s, t, v, w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)* or (i) to (x) which is bonded via one or more of its phenyl moieties to adjacent moieties

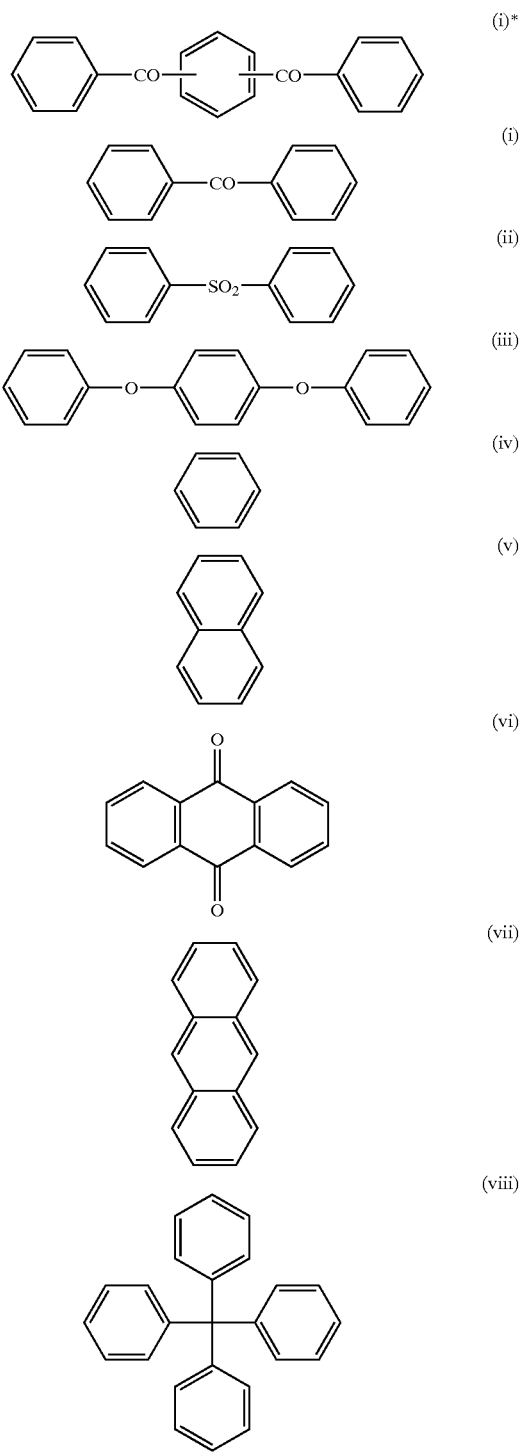

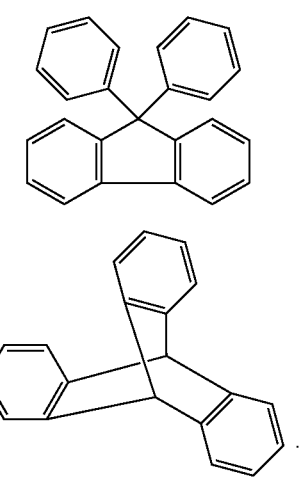

(ix)

(x)

5. A material according to claim 4, wherein said first ion-conductive polymer is a homopolymer having a repeat unit of general formula or a random or block copolymer of at least two different units selected from IV and V or from 1V and V*, wherein A, B, C and D independently represent 0 or 1 and E, E', G, Ar, M, r, s, t, v, w and z are as described in claim 4.

6. A material according to claim 5, wherein said first ion-conductive polymer is a copolymer comprising a first repeat unit selected from the following:
(a) a unit of formula IV wherein E and E represent oxygen atoms, G represents a direct link, Ar represents a moiety of structure (iv), m and s represent zero, w represents 1 and A and B represent 1;
(b) a unit of formula IV wherein E represents an oxygen atom, E' represents a direct link, Ar represents a moiety of structure (i), m represents zero, A represents 1, B represents zero;
(c) a unit of formula V wherein E and E' represent oxygen atoms, G represents a direct link, Ar represents a moiety of structure (iv), m and v represent zero, z represents 1 and C and D represent 1;
(d) a unit of formula V wherein E represents an oxygen atom, E' represents a direct link, Ar represents a moiety of structure (ii), m represents 0, C represents 1, D represents 0; or

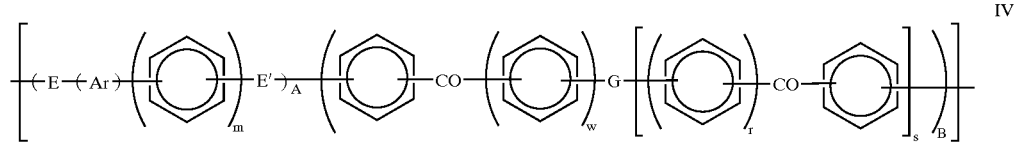

IV or a homopolymer having a repeat unit of general formula

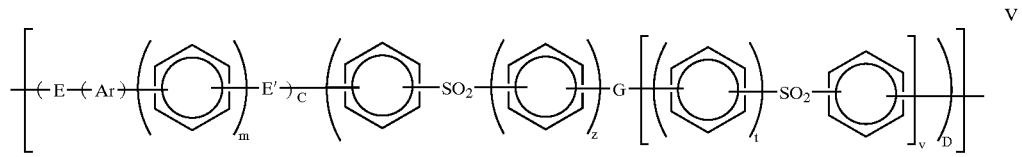

V or a homopolymer having a repeat unit of general formula

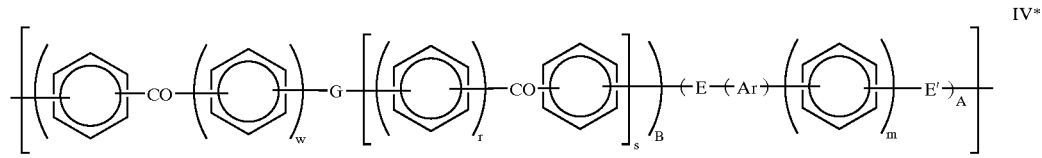

IV* or a homopolymer having a repeat unit of general formula

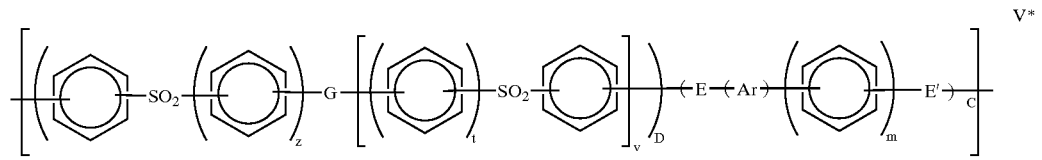

V*

(e) a unit of formula V wherein E and E' represents an oxygen atom, Ar represents a structure (i), m represents 0, C represents 1, Z represents 1, G represents a direct link, v represents 0 and D represents 1;

(aa) a unit of formula IV wherein E represents an oxygen atom, E represents a direct link, Ar represents a structure (i)*, m represents 0, A represents 1, B represents 0;

(bb) a unit of formula IV wherein E and E' represent oxygen atoms, Ar represents a structure (iv), m and w represent 0, G represents a direct link, s and r represent 1, A and B represent 1;

(cc) a unit of formula IV wherein E and E' represent oxygen atoms, Ar represents a structure (i), m and w represent 0, G represents a direct link, s and r represent 1, A and B represent 1;

and a second repeat unit which is selected from the following:

(f) a unit of formula IV wherein E and E' represent oxygen atoms, G represents a direct link, Ar represents a moiety of structure (iv), m represents 1, w represents 1, s represents zero, A and B represent 1;

(g) a unit of formula IV wherein E represents an oxygen atom, E' is a direct link, G represents a direct link, Ar represents a moiety of structure (iv), m and s represent zero, w represent 1, A and B represent 1;

(h) a unit of formula V wherein E and E' represent oxygen atoms, G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct link, Ar represents a moiety of structure (iv), m and v represent zero, z represents 1, C and D represent 1;

(j) a unit of formula IV wherein E and E' represent oxygen atoms, G represents a direct link, Ar represents a moiety of structure (v), m represents 0, w represents 1, s represents 0, A and B represent 1;

(k) a unit of formula V wherein E and E' represent oxygen atoms, G represents a direct link, Ar represents a moiety of structure (v), m represents 0, z represents 1, v represents 0, C and D represent 1.

7. A material according to claim 6, wherein said first ion-conductive polymer comprises a copolymer comprising a unit (a) and/or (c) as described above in combination with a unit (b), (d), (e), (aa), (bb) and/or (cc) as described above.

8. A material according to claim 1, wherein said first ion-conductive polymer is sulphonated.

9. A material according to claim 1, wherein said first ion-conductive polymer includes at least some ketone moieties in the polymeric chain.

10. A material according to claim 1, wherein said first ion-conductive polymer includes a multi-phenylene moiety or a fused ring aromatic moiety.

11. A material according to claim 10, wherein said multi-phenylene moiety or fused ring aromatic moiety is bonded to two oxygen atoms.

12. A material according to claim 1, wherein said first ion-conductive polymer includes a —O-biphenylene-O— or —O-naphthalene-O— moiety.

13. A material according to claim 1, wherein said first ion-conductive polymer has an equivalent weight (EW) of less than 500 g/mol.

14. A material according to claim 1, wherein said second ion-conductive polymer is selected from a thermoplastic or thermoset aromatic polymer, a polybenzazole or a polyaramid polymer, or a perfluorinated ionomer, each of which has been functionalized to provide ion-exchange sites; polystyrene sulphonic acid, polytrifluorostyrene sulphonic acid, polyvinyl phosphonic acid, polyvinyl carboxylic acid and polyvinyl sulphonic acid polymers, and metal salts thereof.

15. A material according to claim 1, wherein said second ion-conductive polymer has an equivalent weight (EW) of less than 2000.

16. A material according to claim 1, wherein said second ion-conductive polymer is semi-crystalline.

17. A material according to claim 1, wherein said composite material incorporates a catalyst material.

18. A fuel cell or electrolyser incorporating a composite material according to claim 1.

19. A composite material as claimed in claim 1 for a polymer electrolyte membrane of a fuel cell.

20. A fuel cell incorporating a polymer electrolyte membrane comprising a composite material as claimed in claim 1.

21. A composite material which includes a first ion-conductive polymer and a support material for the polymer, wherein the support material comprises a second conductive polymer and wherein said first ion-conductive polymer is in contact with said second ion-conductive polymer, said first ion-conductive polymer comprising a polymer selected from a first group consisting of a polysulphone, polyimide, polyphenylene, oxide, polyphenylene sulphoxide, polyphenylene sulphide, polyphenylene sulphide sulphone, polyparaphenylene, polyphenylquinoxaline, polyarylketone, polyetherketone, polybenzazole, polyaramid and a perfluorinated ionomer, each of the aforesaid being functionalized to provide ion-exchange sites; polystyrene sulphonic acid, polytrifluorostyrene sulphonic acid, polyvinylphosphonic acid, polyvinylcarboxylic acid and polyvinylsulphonic acid polymers; and said second ion-conductive polymer being independently selected from a polymer in said first group.

* * * * *